3,497,514
1(2-TERTIARY AMINOETHYL)-2-METHYL-3-ARYL-4-OXO-1,2,3,4-TETRAHYDROQUINAZOLINE DERIVATIVES AND THE PREPARATION THEREOF
Kentaro Okumura, Kobe-shi, Toyonari Oine, Ibaragi-shi, and Yoshihisa Yamada, Osaka-shi, Japan, assignors to Tanabe Seiyaku Co., Ltd., Osaka, Japan, a corporation of Japan
No Drawing. Filed Nov. 15, 1967, Ser. No. 683,144
Claims priority, application Japan, Nov. 19, 1966, 41/76,034, 41/76,036
Int. Cl. C07d 51/48
U.S. Cl. 260—256.4                    8 Claims

ABSTRACT OF THE DISCLOSURE

Analgesics, anti-inflammatories, sedatives and anti-histamines in the form of new derivatives of 4-oxo-1,2,3,4-tetra-hydroquinazoline and method of preparation thereof. Specifically, 1-(2-tertiary aminoethyl) 2-methyl-3-aryl-4-oxo-1,2,3,4-tetra-hydroquinazolines.

These compounds are prepared by cyclization of N-aceto-N(2-tertiary aminoethyl)-anthranilic aryl amide, followed by reduction.

---

The new derivatives of 4-oxo-1,2,3,4-tetra-hydroquinazoline of the present invention have been found to be therapeutically effective as analgesics, anti-inflammatories, sedatives and anti-histamines. They consist of the 1-(2-tertiary aminoethyl)-2-methyl - 3 - aryl substituted compounds of the formula:

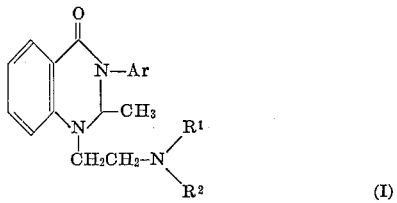

wherein Ar represents a group taken from the class consisting of phenyl, tolyl or xylyl, $R^1$ and $R^2$ are taken from the class consisting of lower alkyl groups or, together, a pentamethylene chain.

All of the compounds prepared in the examples described hereinafter have been found to have sedative action. For example, the compounds are effective to prolong sleeping time which may be induced by the administration of barbital to the extent of about 0.5 to 4.0 times. Among them, the most effective one is 1-(2-piperidinoethyl) - 2-methyl-3-(2,3-xylyl)-4-oxo - 1,2,3,4 - tetra-hydroquinazoline, which can prolong sleeping time up to 4 times at the dose of 100 mg./kg.

It has also been observed that all of the compounds prepared in the examples show an anti-histamic effect, though the activities are slightly weaker than those of chlorpheniramine or diphenhydramine. However, some of them indicate distinguishable analgesic or anti-inflammatory effects in comparison with known compounds.

For example, 3-phenyl and 3-(2-tolyl) derivatives of 1-(2-diethylaminoethyl)-2-methyl - 4 - oxo-1,2,3,4-tetrahydroquinazoline show analgesic effects approximately twice as strong as those of aminopyrine when the compound is administered orally. The 3-(2-tolyl) derivative also has an anti-inflammatory effect which is as effective as phenyl-butazone and 1.5 times stronger than aminopyrine. The anti-inflammatory actions of 1-(2-piperidinoethyl)-2-methyl-3-(2-tolyl) - 4 - oxo - 1,2,3,4 - tetrahydro-quinazoline and 1 - (2-dimethylaminoethyl)-2-methyl-3-phenyl - 4 - oxo - 1,2,3,4 - tetrahydroquinazoline are more effective than those of phenyl-butazone when the compound is administered orally.

The process for the preparation of the compounds (I) of the present invention may be illustrated by the following equations:

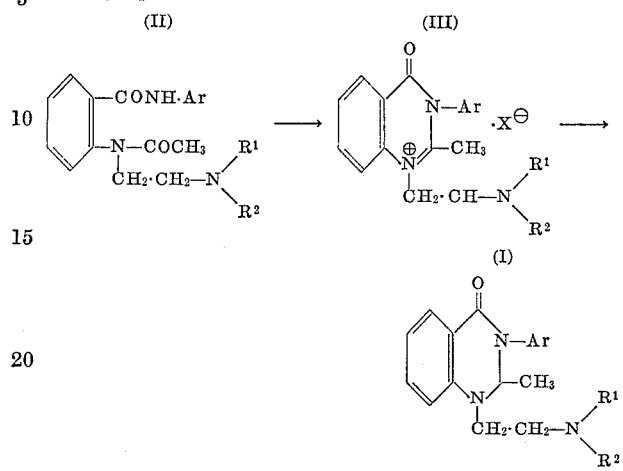

wherein Ar, $R^1$ and $R^2$ have the same meanings as heretofore stated and X represents the anionic moiety of inorganic acid.

The first step for intermolecular cyclization of the starting compound (II) is carried out by treating N-aceto-N-(2-tertiary aminoethyl)-anthranilic arylamide (II) with a conventional inorganic acid such as perchloric acid, perbromic acid, hydroiodic acid, hydrobromic acid, hydrochloric acid, sulfuric acid, etc., thereby producing the corresponding 1 - (2-tertiary aminoethyl)-2-methyl-3-aryl-4 (3H)-quinazolinonium compound (III). It is preferable to use an excess of the inorganic acid. The cyclization reaction under the above mentioned conditions may be carried out satisfactorily even at room temperatures and the compound (III) can be easily recovered from the reaction mixture as crystals of the inorganic acid salt. The second step for reducing the double band in the 1,2-position of the quinazolinonium compound (III) can be carried out by reacting the compound (III) with sodium borohydride. The reaction is preferably carried out in a suitable solvent such as methanol, ethanol, water, etc. at room temperature or under cooling.

The products of the present invention are usually oily substances. However, the compounds can be readily converted into the crystallizable acid addition salts such as hydrochloride, hydrobromide, oxalate, picrate, picrolonate, etc. by conventional treatment.

As the substituents $R^1$ and $R^2$, alkyl groups having one to 8 carbon atoms such as methyl, ethyl, propyl, butyl, etc. are employable in this invention and the alkyl homologs of the products of the Examples 1 to 6 can be prepared according to the similar procedures employed in these examples with substantially the same results.

The starting compounds (II) of the present invention can be prepared, for instance, by acetylating N-(2-tertiary aminoethyl)-anthranilic acid and condensing the resulting N-aceto-N-(2-tertiary aminoethyl)-anthranilic acid with an arylamine.

Practical embodiments of the present invention are illustratively shown in the following examples.

EXAMPLE 1

4.9 g. of 2-[N-(2-dimethylaminoethyl)-acetamido]-benzanilide is dissolved in 30 ml. of benzene. 4.3 ml. of 60% perchloric acid is admixed into the solution. The resultant crystals are collected by filtration and recrystallized from a mixture of dimethylformamide and ethanol, whereby 7.1 g. of 1-(2-dimethyl-aminoethyl)-2-methyl-3-phenyl - 4(3H) - quinazolinonium perchlorate·hydroperchlorate is obtained. M.P. 255–256° C. (decomp.).

*Analysis*.—Calculated for $C_{19}H_{23}O_9N_3Cl_2$: C, 44.89%; H, 4.57%; N, 8.27%. Found: C, 45.08%; H, 4.31%; N, 8.34%.

5.0 g. of the quinazolinonium perchlorate compound thus obtained is suspended on 50 ml. of ethanol. 0.9 g. of sodium borohydride dissolved in 50 ml. of ethanol is added dropwise to the suspension for 3 hours at 0±2° C. with stirring, thereby dissolving the suspended crystal gradually. After 30 minutes, the reaction mixture is evaporated to remove ethanol under reduced pressure. A proper amount of water is added to the residue and the resultant oily substance extracted with ether. The ether layer is dried with anhydrous potassium carbonate, evaporated to remove the ether and the resultant transparent viscous substance distilled under reduced pressure.

Thus, 2.0 g. of 1-(2-dimethylaminoethyl)-2-methyl-3-phenyl-4-oxo1,2,3,4-tetrahydro-quinazoline is obtained. B.P. 250–255° C./0.2 mm. Hg.

*Analysis*.—Calculated for $C_{19}H_{23}ON_3$: C, 73.75%; H, 7.49%; N, 13.58%. Found: C, 73.29%; H, 7.08%; N, 13.61%.

EXAMPLE 2

4.4 g. of 2-[N-(2-dimethylaminoethyl)-acetamido]-2'-methyl-benzanilide is dissolved in 30 ml. of ethanol. 3.5 ml. of 60% perchloric acid is admixed into the solution. The resultant crystals are collected by filtration and recrystallized from a mixture of acetone and dimethyl formamide, whereby 6.4 g. of 1-(2-dimethyl-aminoethyl)-2-methyl-3 - (2 - tolyl)-4(3H)-quinazolinonium perchlorate·hydroperchlorate is obtained. M.P. 259–260° C. (decomp.).

*Analysis*.—Calculated for $C_{20}H_{25}O_9N_3Cl_2$: C, 46.18%; H, 4.82%; N, 8.05%. Found: C, 46.08%; H, 4.61%; N, 7.91%.

5.0 g. of the quinazolinonium perchlorate compound thus obtained is suspended on 60 ml. of ethanol. 0.8 g. of sodium borohydride dissolved in 90 ml. of ethanol is added dropwise to the suspension for 4.5 hours at temperature from —5° C. to —2° C. with stirring. Then, the reaction mixture is evaporated to remove ethanol under reduced pressure and the residue extracted with ether after adding a proper amount of water. The ether extract is dried with anhydrous potassium carbonate and evaporated. The remaining 2.5 g. of light-yellow oily substance is dissolved in ether, and an ethanol solution of picrolonic acid added to the solution. The resultant crystals are collected by filtration and recrystallized from ethanol, whereby 3.6 g. of 1-(2-dimethylaminoethyl)-2-methyl-3-(2-tolyl)-4-oxo-1,2,3,4-tetra - hydroquinazoline perchlorate·hydroperchlorate is obtained. M.P. 260–

*Analysis*.—Calculated for $C_{30}H_{33}O_6N_7$: C, 61.23%; H, 5.66%; N, 16.68%. Found: C, 61.72%; H, 5.41%; N, 16.59%.

EXAMPLE 3

4.5 g. of 2-[N-(2-dimethylaminoethyl)-acetamido]-2',3'-dimethyl-benzanilide is dissolved in 40 ml. of ether. 4 ml. of 60% perchloric acid is admixed into the solution. The resultant crystals are collected by filtration and recrystallized from a mixture of acetone, dimethylformamide and ether. Thus, 6.1 g. of 1-(2-dimethylaminoethyl)-2-methyl-3-(2,3-xylyl) - 4(3H) - quinazolinonium perchlorate·hydroperchlorate is obtained. M.P. 260–261° C. (decomp.).

*Analysis*.—Calculated for $C_{21}H_{27}O_9N_3Cl_2$: C, 47.02%; H, 5.07%; N, 7.83%. Found: C, 47.02%; H, 4.79%; N, 7.91%.

5.0 g. of the quinazolinonium perchlorate compound thus obtained is suspended on 60 ml. of ethanol. 0.75 g. of sodium borohydride dissolved in 90 ml. of ethanol is added dropwise to the suspension for 3 hours at temperature —5° C. to —3° C. with stirring. Then, the reaction mixture is evaporated to remove ethanol under reduced pressure and the residue extracted with ether after adding a proper amount of water. The extract is dried with anhydrous potassium carbonate and evaporated to remove the ether thereby crystallizing the residue. The crystals are recrystallized from n-hexane to give 2.0 g. of 1-(2-dimethylaminoethyl)-2-methyl-3-(2,3-xylyl)-4-oxo-1,2,3,4-tetrahydroquinazoline. M.P. 102–103° C.

*Analysis*.—Calculated for $C_{21}H_{27}ON_3$: C, 74.74%; H, 8.07%; N, 12.45%. Found: C, 74.49%; H, 7.89%; N, 12.42%.

EXAMPLE 4

2-[N-(2-diethylaminoethyl)-acetamido]benzanilide is reacted with perchloric acid by similar procedure to that of Example 1, whereby 1-(2-diethylaminoethyl)-2-methyl-3 - phenyl-4(3H) - quinazolinonium perchlorate·hydroperchlorate is obtained. M.P. 248–249° C. Yield: 53% (after recrystallization from dimethyl-formamide-acetone-ether).

*Analysis*.—Calculated for $C_{21}H_{27}O_9N_3Cl_2$: C, 47.02%; H, 5.07%; N, 7.83%. Found: C, 46.78%; H, 4.69%; N, 8.05%.

The quinazolinonium perchlorate compound thus obtained (by similar procedure to that of Example 2) is reacted with sodium borohydride and the resultant 1-(2-dimethylaminoethyl) - 2 - methyl-3-phenyl-4-oxo-1,2,3,4-tetrahydroquinazoline is converted into the oxalate. After recrystallization from methanol: M.P. 182–183° C. (decomp.).

*Analysis*.—Calculated for $C_{23}H_{29}O_5N_3$: C, 64.62%; H, 6.84%; N, 9.83%. Found: C, 64.64%; H, 6.75%; N, 9.86%.

EXAMPLE 5

2-[N-(2-diethylaminoethyl)-acetamido]-2'-methylbenzanilide is reacted with perchloric acid by similar procedure to that of Example 1, whereby 1-(2-diethylaminoethyl)-2-methyl-3-(2-tolyl)-4(3H) - quinazolinonium perchlorate·hydroperchlorate is obtained. M.P. 193–195° C. Yield: 50% (after recrystallization from ethanol).

*Analysis*.—Calculated for $C_{22}H_{29}O_9N_3Cl_2 \cdot H_2O$: C, 46.49%; H, 5.50%; N, 7.39%. Found: C, 46.66%; H, 5.13%; N, 7.19%.

The quinazolinonium perchlorate compound thus obtained is made to react with sodium borohydride (by similar procedures to that of Example 2) and the resultant 1-(2 - diethylaminoethyl)-2-methyl-3-(2-tolyl)-4-oxo-1,2,3,4-tetrahydroquinazoline is converted into the picrate. After recrystallization from methanol: M.P. 158–160° C. (decomp.). Yield: 79%.

*Analysis*.—Calculated for $C_{28}H_{32}O_8N_6$: C, 57.90%; H, 5.56%; N, 14.48%. Found: C, 58.04%; H, 5.38%; N, 14.18%. The oxalate: D.P. 242–245° C. (after recrystallization from methanol-ether; 1:2).

EXAMPLE 6

2-[N-(2-diethylaminoethyl) - acetamido]-2',3'-dimethyl benzanilide is reacted with perchloric acid by similar procedure to that of Example 1, whereby 1-(2-diethylaminoethyl)-2-methyl-3-(2,3-xylyl) - 4(3H) - quinazolinonium perchlorate·hydroperchlorate is obtained. After recrystallization from ethanol: M.P. 220–222° C. Yield: 38%.

*Analysis*.—Calculated for $C_{23}H_{31}O_9N_3Cl_2$: C, 48.94%; H, 5.55%; N, 7.45%. Found: C, 48.95%; H, 5.10%; N, 7.15%.

The quinazolinonium perchlorate compound thus obtained is reacted with sodium borohydride (by similar procedures to that of Example 3) whereby 1-(2-diethylaminoethyl)-2-methyl - 3 - (2,3-xylyl)-4-oxo-1,2,3,4-tetrahydroquinazoline is obtained. After recrystallization from n-hexane: M.P. 110–111° C. Yield: 76%.

*Analysis*.—Calculated for $C_{23}H_{31}ON_3$: C, 75.58%; H, 8.55%; N, 11.50%. Found: C, 75.66%; H, 8.53%; N, 11.48%. The oxalate: D.P. 171–173° C. (ethanol).

EXAMPLE 7

2-[N-(2-piperidinoethyl)-acetamide]-benzanilide is reacted with perchloric acid by similar procedures to that of Example 1, whereby 1-(2-piperidinoethyl)-2-methyl-3-phenyl - 4(3H) - quinazolinonium perchlorate·hydroperchlorate is obtained. After recrystallization from dimethylformamide-ethanol: M.P. 249–250° C. (decomp.). Yield: 58%.

*Analysis.*—Calculated for $C_{22}H_{27}O_9N_3Cl_2$: C, 48.17%; H, 4.98%; N, 7.66%. Found: C, 48.26%; H, 5.65%; N, 8.18%.

The quinazolinonium perchlorate compound thus obtained is reacted with sodium borohydride (by similar procedures to that of Example 2) and the resultant 1-(2-piperidinoethyl)-2-methyl - 3 - phenyl-4-oxo-1,2,3,4-tetrahydroquinazoline is converted into the hydrochloride. After recrystallization from ethanol: M.P. 242–244° C. (decomp.). Yield: 68%.

*Analysis.*—Calculated for $C_{22}H_{18}ON_3Cl$: C, 68.46%; H, 7.31%; N, 10.89%. Found: C, 68.40%; H, 7.50%; N, 10.78%.

EXAMPLE 8

2-[N-(2-piperidinoethyl)-acetamide]-2-methylbenzanilide is reacted with perchloric acid by similar procedures to that of Example 1, whereby 1-(2-piperidinoethyl)-2-methyl-3-(2-tolyl)-4(3H) - quinazolinonium perchlorate·hydroperchlorate is obtained. After recrystallization from dimethylformamide-ethanol: M.P. 253–255° C. (decomp.). Yield: 30%.

*Analysis.*—Calculated for $C_{23}H_{29}O_9N_3Cl_2$: C, 49.11%; H, 5.21%; N, 7.47%. Found: C, 49.85%; H, 5.47%; N, 7.37%.

The quinazolinonium perchlorate compound thus obtained is reacted with sodium borohydride (by similar procedures to that of Example 2) and the resultant 1-(2-piperidinoethyl)-2-methyl-3-(2 - tolyl)-4-oxo-1,2,3,4-tetrahydroquinazoline is converted into the hydrochloride. After recrystallization from methanol: M.P. 264–266° C. (decomp.).Yield: 61%.

*Analysis.*— Calculated for $C_{23}H_{30}ON_3CI$: C, 69.07%; H, 7.56%; N, 10.51%. Found: C, 68.67%; H, 7.58%; N, 10.57%.

EXAMPLE 9

2 - [N - (2 - piperidinoethyl)-acetamido]-2,3′-dimethyl-benzanilide is reacted with perchloric acid by similar procedure to that of Example 1, whereby 1-(2-piperidinoethyl) - 2 - methyl - 3-(2,3-xylyl)-4(3H)-quinazolinonium perchlorate·hydroperchlorate is obtained. After recrystallization from dimethylformamide-ethanol: M.P. 233–235° C. (decomp.). Yield: 54%.

*Analysis.*—Calculated for $C_{24}H_{31}O_9N_3Cl_2$: C, 50.00%; H, 5.48%; N, 7.29%. Found: C, 50.69%; H, 5.57%; N, 7.13%.

The quinazolinonium perchlorate compound thus obtained is reacted with sodium borohydride (by similar procedures to that of Example 2) and the resultant 1-(2-piperidinoethyl) - 2 - methyl - 3-(2,3-xylyl)-4-oxo-1,2,3,4-tetrahydroquinazoline is converted into the hydrochloride. After recrystallization from ethanol-ether: M.P. 250–252° C. (decomp.). Yield: 64%.

*Analysis.*—Calculated for $C_{24}H_{32}ON_3Cl$: C, 69.63%; H, 7.79%; N, 10.15%. Found: C, 69.51%; H, 8.09%; N, 10.35%.

In any of the foregoing examples the corresponding normal or iso propyl, butyl, amyl, hexyl, heptyl or octyl compounds may be substituted for the methyl or ethyl compounds with like effect.

What we claim is:

1. 1 - (2 - tertiary aminoethyl) - 2-methyl-3-aryl-4-oxo-1,2,3,4-tetrahydroquinazoline compound represented by the formula:

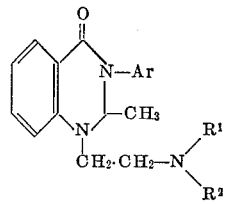

and nontoxic acid addition salts thereof, wherein Ar represents phenyl, tolyl or xylyl group, $R^1$ and $R^2$ represent alkyl groups having one to 8 carbon atoms or together a pentamethylene chain.

2. Compounds according to claim 1 wherein said tertiary amino is dimethyl amino, diethyl amino or piperidino.

3. Compounds according to claim 2 wherein Ar is phenyl, 2-tolyl or 2,3 xylyl.

4. Compounds according to claim 2 wherein said tertiary amino is piperidino and said Ar is 2,3-xylyl.

5. A process for preparing 1-(2-tertiary aminoethyl)-2-methyl - 3 - aryl-4-oxo-1,2,3,4-tetrahydroquinazoline compound represented by the Formula I:

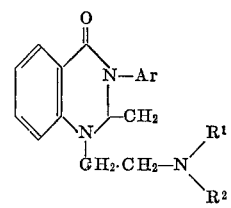

(I)

wherein Ar represents phenyl, tolyl or xylyl group, $R^1$ and $R^2$ represent alkyl groups having one to 8 carbon atoms respectively or together a pentamethylene chain which comprises treating N-aceto-N-(2-tertiary aminoethyl)-anthranilic arylamide represented by the Formula II:

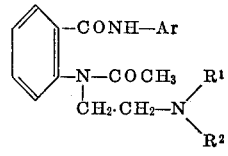

(II)

wherein Ar, and $R^1$ and $R^2$ have the same meanings as stated above, with an inorganic acid and reacting the resultant 1-(2-tertiaryaminoethyl)-2-methyl-3-aryl-4-(3H)-quinazolinonium compound with an alkali metal borohydride.

6. A process according to claim 5 wherein said inorganic acid is taken from the class consisting of perchloric, perbromic, hydriodic, hydrobromic, hydrochloric and sulfuric.

7. A process according to claim 5 wherein said tertiary amino is piperidino and said aryl is 2,3-xylyl.

8. A process according to claim 5 wherein said alkali metal is sodium.

References Cited

UNITED STATES PATENTS 3,213,094 10/1965 Morgan et al. ----- 260—256.4
3,215,697 11/1965 Hauptmann et al. --- 260—256.4

ALEX MAZEL, Primary Examiner

R. J. GALLAGHER, Assistant Examiner

U.S. Cl. X.R.

424—251